United States Patent [19]

Reinhorn et al.

[11] Patent Number: 5,154,574

[45] Date of Patent: Oct. 13, 1992

[54] GEARLESS AIR MOTOR

[76] Inventors: Ed Reinhorn; Matt Reinhorn; Eric J. Reinhorn, all of 10744 Prospect Ave., Suite A, Santee, Calif. 92071

[21] Appl. No.: 563,115

[22] Filed: Aug. 6, 1990

[51] Int. Cl.$^5$ .............................................. F01D 15/12
[52] U.S. Cl. ............................ 415/124.1; 415/214.1; 474/84; 474/88; 416/241 A; 416/223 R; 74/DIG. 5
[58] Field of Search ................ 415/202, 122.1, 124.1, 415/200, 904, 182.1, 214.1; 416/241 R, 241 A, 224, 223 R; 74/DIG. 5; 474/84, 88, 89

[56] References Cited

U.S. PATENT DOCUMENTS

| | | | |
|---|---|---|---|
| 2,115,997 | 5/1938 | Morse | 416/224 |
| 2,120,277 | 6/1938 | Grierson | 416/224 |
| 3,094,075 | 6/1963 | Logue | 416/224 |
| 3,155,045 | 11/1964 | Lown et al. | 416/224 |
| 3,466,724 | 9/1969 | Morris, Sr. | 415/214.1 |
| 3,635,576 | 1/1972 | Wieckmann | 415/122.1 |
| 3,659,471 | 5/1972 | Marsch | 416/224 |
| 3,813,956 | 6/1974 | Whitecar | 474/88 |
| 3,846,045 | 11/1974 | Mincuzzi | 416/224 |
| 3,853,432 | 12/1974 | Cronstedt | 415/122.1 |
| 4,137,006 | 1/1979 | Becker | 415/214.1 |
| 4,208,777 | 6/1980 | Walsh et al. | 415/214.1 |
| 4,245,957 | 1/1981 | Savage et al. | 416/241 A |
| 4,661,086 | 4/1987 | Railsback | 474/88 |
| 4,732,541 | 3/1988 | Hyll | 416/224 |
| 4,762,465 | 8/1988 | Friedrichs | 416/224 |

FOREIGN PATENT DOCUMENTS

| | | | |
|---|---|---|---|
| 1115585 | 10/1961 | Fed. Rep. of Germany | 416/224 |
| 359036 | 1/1962 | Switzerland | 416/224 |
| 715923 | 9/1954 | United Kingdom | 416/241 A |

OTHER PUBLICATIONS

*TDI Turbostart* Engine Air Starters, Sep. 1982.

Primary Examiner—Thomas E. Denion
Attorney, Agent, or Firm—Ralph S. Branscomb

[57] ABSTRACT

A gearless air motor utilizes a high speed rotor having turbine buckets defined in epoxy rather than metal to substantially avoid the danger inherent in high speed rotor fragmentation. The unit has a housing which contains the compressed air chamber, the rotor chamber and a speed reduction chamber in which a toothed belt speed reduction system avoids the use of gears for speed reduction, with their relatively high friction and noise output.

9 Claims, 1 Drawing Sheet

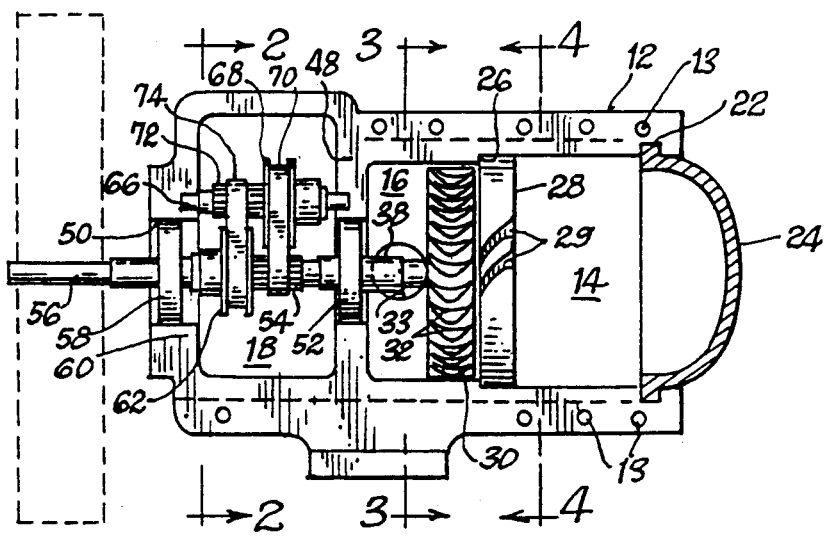
FIG. 1
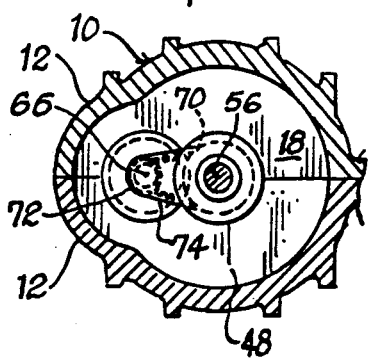
FIG. 2
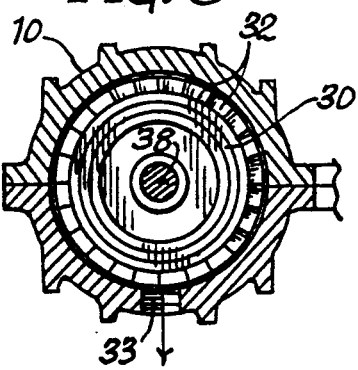
FIG. 3
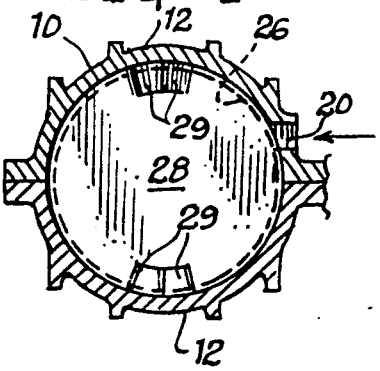
FIG. 4
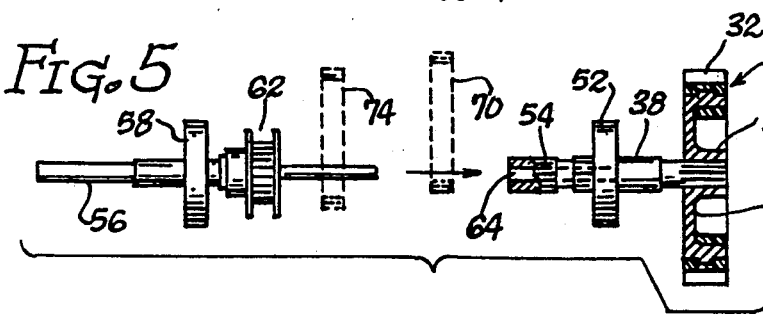
FIG. 5
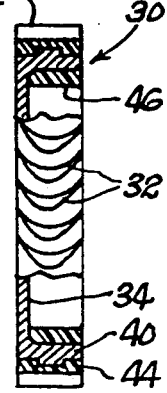
FIG. 6
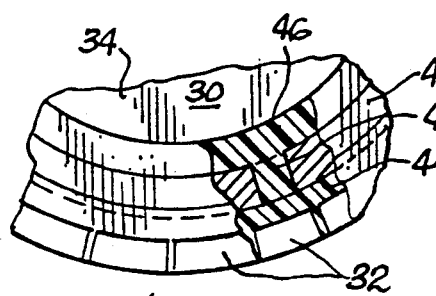
FIG. 7
FIG. 8

GEARLESS AIR MOTOR

BACKGROUND OF THE INVENTION

The invention is in the field of air motors, and in particular pertains to an air motor which is designed to reduce the drawbacks of air motors as currently perceived in industry, with the aim of replacing electric motors, especially in environments in which sealed, anti-explosion electric motors must be used, if electric motors can be used at all.

In many different industrial environments, such as chemical plants, refineries, gas companies and shipyards, motors must be used for ventilation, pumping and other purposes which must operate in a potentially explosive environment. A spark-ignited fire in such a facility could quickly and easily cause millions of dollars in damage with the ensuing possibility of the destruction of lives.

Consequently, explosion-proof electric motors are subject to very high quality control standards, and have special housings which contain the sparks that are an inherent part of the operation of any electric motor.

There are a number of drawbacks in using explosion-proof electric motors. However, these drawbacks are perceived in the industry as basically unavoidable, as they are inherent in the use of explosion proof motors.

First, every motor that is made explosion proof is necessarily considerably more expensive than a motor used in an environment in which the presence of relatively open sparks is not a problem. However, the expense does not stop at the motor itself. There is also additional expense in any switches used to control the motor, any connectors, and the wiring and junction boxes installed in the plant are also of special, and more expensive, construction. Naturally, quality control standards are higher. More parts must be inventoried to accommodate explosion proof and non-explosion proof installations, with the accompanying inventorying cost and the inherent possibility of accidentally switching the two with potentially disastrous results.

Liability insurance costs, both for motor manufacturers and users of spark-free electric motors, is an added burden on the cost. As with everything else involving liability, these costs are increasing at a disturbing rate.

Electric motors tend to be quite reliable, and require infrequent maintenance. Nothing runs forever, however, and when maintenance is required, explosion proof motors must be sent back to the factory to be repaired or rebuilt. Not only is this quite expensive compared to on-site repair, but in the event that the motor is essential and a backup is not available, entire operations can grind to a halt for the want of an operative explosion-proof motor.

An air motor would seem to be an obvious alternative to an electric motor, and particularly to an explosion-proof electric motor since no sparks are produced anywhere along the compressed air pipes, junctions, hoses or at the motor itself. There are several reasons that traditionally air motors have not been widely used. First, high-speed turbine driven air motors are considered to be less reliable than electric motors and subject to more frequent maintenance. Although low speed air motors used, for example, in stirring vats of paint at 800 RPM are used, and high torque air motors are used for brief intermittent operations such as for starting diesel engines, it has been thought in industry that high speed, high duty cycle air motors, which have rotors operating at 5,000 to 10,000 RPM 24 hours a day for long periods of time at a stretch, will frequently break down and require maintenance.

There is also the problem of the noise of high speed rotor-driven air motors. The rotor itself can be somewhat noisy and requires a muffler. On top of the rotor, the gears traditionally used to reduce the output speed and increase the torque of high speed turbine motors, themselves produce a considerable whine.

There is also an at least partially justifiable fear of air motors due to the propensity of the rotor to fragment at high speed. Traditionally the rotor has been made of metal, with the buckets of the bucket-type turbine rotor being milled into the periphery of a metal disc. At the extremely high speeds at which the rotors operate, if centrifugal force eventually succeeds in pulling the rotor apart so that it fragments, several relatively large projectiles are immediately formed which not only tend to destroy the interior of the motor, but could fly out and cause injury to personnel or equipment. Rotor fragmentation damage can be reduced or avoided by using a heavy motor casing, but then of course materials cost rise, and portability drops.

Vane-type air motors, which comprise about 80% of all air motors in use, are not generally run over about 800 RPM and require lubrication. They cannot be used for more than two or three hours at high RPM, and the rotors require frequent replacement. Despite these limitations, if possible vane-type motors are sometimes used in spark-free environments, with the frequent replacement of the vane rotor being accepted as part of the necessary operating expense. However, due to the speed restrictions, they are used more in vacuum pump applications than for ventilation.

There is a need for a versatile, light-weight high-speed air motor which operates relatively quietly, and takes advantage of state-of-the-art materials to produce a motor capable of replacing high duty cycle electric motors in industrial applications, and particularly explosion proof electric motors.

SUMMARY OF THE INVENTION

The air motor of the instant invention has a light weight, cast aluminum housing made of two mating half shells which can easily be disassembled to expose replaceable, internal parts for maintenance.

The housing forms a compressed air chamber and a rotor chamber, in which a specially constructed turbine bucket rotor is journalled. The axis of the rotor extends into a speed reduction chamber where the rotor shaft journals the interior end of an output shaft in an in-line arrangement, with toothed belt sprockets provided on both shafts which are mutually engaged through a third shaft journalled in the drive reduction chamber to reduce the output speed of the main rotor at least two-to-one, and generally more.

The speed reduction with toothed belts eliminates the need for any gearing, and the accompanying noise. Rotor speeds may be reduced by 2:1 to 12:1 ratios depending on the output torque and speed requirements, and the available pressure from the compressed air source.

BRIEF DESCRIPTION OF THE DRAWINGS

FIG. 1 is an elevation view of one half-shell of the motor housing showing the internal parts as they would seat waiting for the second half shell;

FIG. 2 is a section taken along line 2—2 of FIG. 1;
FIG. 3 is a section taken along line 3—3 of FIG. 1;
FIG. 4 is a section taken along line 4—4 of FIG. 1;
FIG. 5 is an exploded elevation view of the speed reduction assembly;
FIG. 6 is a view, partially in section of the turbine rotor;
FIG. 7 is a side elevation view of the rotor with a portion cut away showing the path-through opening in the cast aluminum disc phalange; and,
FIG. 8 is a detail of the injector port disc with a portion cut away.

DETAILED DESCRIPTION OF THE PREFERRED EMBODIMENT

The motor has a housing 10 which consists of two identical or substantially identical half shells 12. The housing defines a compressed air chamber 14, a rotor chamber 16 and a speed reduction chamber 18.

Although the compressed air chamber could theoretically be omitted, as a practical matter it is necessary as an accumulator or buffer to smooth pressure spikes in the air lines caused by external demand and by the spinning of the rotor itself. The compressed air chamber has an air inlet port 20 in one wall for connection to an air hose, and it also defines an annular channel 22 which seats the end wall 24, and a shoulder 26 which seats an injector disc 28 which in the prototype embodiment and the embodiment illustrated, defines a pair of injection nozzles 30.

In the rotor chamber, the rotor 30 resides, defining a multiplicity of angularly spaced peripheral turbine buckets 32 driven by the air through the injectors. The rotor is the subject of a second concurrently filed patent application. In summary, it is made from an aluminum disc 34 which has a peripheral annular flange 40. The buckets 32 are part of a unitary structure made of a highly moldable epoxy compound. During the process, the aluminum disc is spun inside an expandable rubber mold, with the liquid epoxy compound introduced just inside the aluminum flange, so that it flows through the flange at eight holes 40, forming an outer ring 44 with the turbine buckets 32 unitary therewith, and an inner ring 46 such that the aluminum flange 40 is sandwiched between the two annular rings of epoxy compound. The inner ring is for the purposes of both securing the outer ring and the buckets in place, and for providing a reasonably easily shaveable surface for balancing purposes.

The shaft 38 of the rotor passes through the partition 48 which separates the rotor chamber from the speed reduction chamber. This partition also has a cavity 50, defined the corresponding housing half shells, which seats a bearing 52 for the rotor shaft.

On the other side of the bearing, the speed reduction system is housed in the chamber 18. The speed reduction system comprises a first toothed belt sprocket 54 of relatively small diameter. The output shaft 56, which is journalled in a bearing 58 in the end wall 60 of the housing mounts a second toothed belt sprocket 62. In the preferred embodiment, illustrated in FIG. 5, the output shaft is journalled inside a socket 64 in the end of the rotor shaft so that an in-line speed reduction drive assembly is produced.

Returning to the interior of the speed reduction chamber 18, a third shaft 66 is journalled in the housing so that it rotates about an axis parallel to the axes of the rotor shaft and the output shaft. The third shaft has a belt sprocket 68 which engages the first sprocket 54 with a toothed belt 70. As shown in the drawings, sprocket 68 is considerably larger than sprocket 50, so that a speed reduction between the rotor shaft and the third shaft is achieved. At the other end of the third shaft is a fourth belt sprocket 72 which engages the sprocket 62 with belt 74. The size ratios of these two sprockets causes yet a further reduction in the output speed realized on the output shaft 56. The final output speed of 3,000 to 4,000 RPM translates to a typical rotor speed on the order of 12,000 RPM, high enough to achieve considerable energy output while still only a fraction of the speed at which the risk of rotor breakup comes into play.

The motor typically runs on 65 psi air, with the 3 horsepower size consuming about 70 cubic feet per minute and exhausting about 1500 cubic feet. Increasing the pressure and intake to 80 psi and 100 cubic feet per minute produces greater speed and power for applications in which increased performance is needed. Output torque and speed can be traded off within the speed reduction parameters of 2:1 to 12:1, and whereas a 3 horsepower motor is a standard workhorse, much smaller and larger motors are can be used using the same construction.

The rotor of the instant invention has been deliberately taken to a speed at which it breaks apart to test the manner in which it fragments, which is well beyond 60,000 RPM. In contrast to the performance of the all-metal rotors that are currently in use, the combination aluminum disc and epoxy compound periphery and bucket structure results in the breaking of the epoxy compound into granules and small particles, with no particles being large enough to cause serious damage were they expelled from the motor.

As can be envisioned from FIG. 1, all of the parts of the motor are just slipped into place. Once the two half shells are separated, any part can be very easily removed with a replacement part simply being dropped back into place. These replaceable parts include not only both bearings, the three shafts, the two belts, the rotor and the injector disc, but the end wall 24 as well. Thus, short of the destruction of the interior of the housing, it is so easy to take apart the half shells and replace broken parts that even should the maintenance schedule require parts replacement or reconditioning with more frequency than with an electric motor, it can be done so quickly and simply on-site, inventorying such a minimum number of parts, that it should be welcomed by factory maintenance personnel who otherwise would have to unmount a heavy explosion proof electric motor and send it back to the factory.

Speaking of weight, a 3 horsepower motor made according to the disclosed construction would weigh about 9 lbs., considerably less than the 17 lbs. or so of its predecessor motor. Because of the new composition of the rotor, among other reasons, the casing is made of cast aluminum and can be relatively thin walled.

An explosion proof electric motor which this motor would replace, on the other hand, would weigh around 100 lbs. For this reason the instant motor is perfectly adapted not just to installed implementations, but also for use as a portable ventilation unit in mine shafts and for cleaning out paint vats, etc. It is essentially oiless, totally spark-free, light weight, and can take fuller advantage of the very expensive high power and high volume air compressors that virtually all factories, refineries, and processing plants have on-site. On Navy ships, in which all electric motors must be explosion proof, the instant motor should provide a particular boon due to the awkwardness of removing a motor and sending it back to the factory when the ship is at sea, and the critical nature of many operations in which the motors are assisting. It is believed and hoped that within the next few years, this motor will make significant inroads into what has previously been the exclusive domain of explosion-proof electric motors.

It is hereby claimed:

1. A gearless speed-reduced air turbine motor comprising:
   (a) a housing defining a rotor chamber and a speed-reduction area;
   (b) a turbine rotor rotatably mounted in said rotor chamber and an air injector powering said rotor;
   (c) a rotor shaft journaled in said housing and mounting said rotor thereon;
   (d) an output shaft journaled in said housing;
   (e) a first belt sprocket mounted on said rotor shaft in said speed reduction area and a second belt sprocket mounted on said output shaft in said speed reduction area;
   (f) belt connection means whereby said second sprocket is driven by said first sprocket, sprockets and belt connection means being dimensioned and connected such that said output shaft rotates at a speed reduced from the speed of said rotor shaft;
   (g) said belt connection means comprising a first and second belt and a third shaft journaled in the speed reduction area of said housing, with an axis parallel to said rotor shaft and said output shaft, and said third shaft having third and fourth belt sprockets thereon and said two belts respectively engaging said first and third sprockets and said second and fourth sprockets such that the driven and driving ends of each belt result in a reduction in speed at the respective sprockets;
   (h) said belts being toothed belts and said sprockets being toothed sprockets;
   (i) said housing defines a partition between said rotor chamber and said speed reduction area and including a bearing mounted in said partition for journaling said rotor shaft;
   (j) said output shaft extending through an output end wall of said housing and including a bearing mounted in said output end wall to journal said output shaft; and,
   (k) said speed reduction area comprising a completely enclosed speed reduction chamber defined by said housing such that all of said belts, sprockets and shafts are completely enclosed within said housing and only an extended end of said output shaft resides outside said housing.

2. Structure according to claim 1 wherein said rotor shaft and output shaft are coaxial and said rotor shaft and output shaft axially extend one over the other in mutual coaxial rotational relation.

3. An air turbine motor comprising:
   (a) a housing defining a rotor chamber;
   (b) a turbine rotor rotatably mounted in said rotor chamber and an air injector powering said rotor;
   (c) a rotor shaft journaled in said housing and mounting said rotor thereon;
   (d) an output shaft driven by said rotor shaft and being journaled in said housing;
   (e) said rotor having a rotational axis and said housing being defined as a pair of mating half shells mating along a substantially planar longitudinal interface substantially passing through said axis and having means to hold same together to define said housing, and being separable to expose said rotor chamber, rotor shaft and output shaft such that said motor is easily disassemblable with slip-out parts; and
   (f) said housing defining a speed reduction area adjacent to said rotor chamber and including:
      (i) a first belt sprocket mounted on said rotor shaft in said speed reduction area and a second belt sprocket mounted on said output shaft in said speed reduction area; and,
      (ii) belt connection means whereby said second sprocket is driven by said first sprocket, said sprockets and belt connection means being dimensioned and connected such that said output shaft rotates at a speed reduced from the speed of said rotor shaft;
   (g) said belt connection means comprising a first and second belt and a third shaft journaled in the speed reduction area of said housing, with an axis parallel to said rotor shaft and said output shaft, and said third shaft having third and fourth belt sprockets thereon and said two belts respectively engaging said first and third sprockets and said second and fourth sprockets such that the driven and driving ends of each belt result in a reduction in speed at the respective sprocket, and
      (iii) said third shaft also lying substantially along said substantially planar longitudinal interface between said half shells such that when said half shells are separated, said third shaft can be lifted out of said speed reduction area.

4. Structure according to claim 3 wherein said rotor shaft and output shaft are coaxial and axially extend one over the other in coaxial rotational relation lying substantially in said substantially planar longitudinal interface such that both said rotor shaft and output shaft can be lifted out of said housing when said half shells are separated.

5. Structure according to claim 3 wherein said housing defines a partition between said rotor chamber and said speed reduction area and including a bearing removably seated in said partition for journaling said rotor shaft such that said bearing can be removed from said housing upon separating said half shells.

6. Structure according to claim 5 wherein said output shaft extends through an output end wall of said housing and including a bearing removably seated in said output end wall to journal said output shaft.

7. Structure according to claim 6 wherein said housing is substantially cylindrical and defines an annular channel at its end remote from said output endwall, and including an endwall seated in said channel to completely enclose the interior of said motor.

8. An air turbine motor comprising:
   (a) a housing defining a rotor chamber;
   (b) a turbine rotor rotatably mounted in said rotor chamber and an air injector powering said rotor;
   (c) a rotor shaft journaled in said housing and mounting said rotor thereon;
   (d) an output shaft driven by said rotor shaft and being journaled in said housing;
   (e) said rotor defining a plurality of spaced turbine buckets around the outer perimeter, and said turbine buckets being defined of plastic material to minimize damage from high speed rotor fragmentation;

(f) said rotor comprising a radially inner disc portion mounted to said rotor shaft and a radially outer plastic bucket ring defining said buckets, said disc portion defining an annular flange, and said plastic ring lying outside said flange and connecting through holes in said flange to an inner plastic balancing ring.

9. Structure according to claim 8 wherein said bucket ring and balancing ring are of an integral molded epoxy construction.

* * * * *